United States Patent

Stoltz

[15] 3,659,392

[45] May 2, 1972

[54] BRICK-LAYING MACHINE

[72] Inventor: Andries Johannes Stoltz, Pretoria, Republic of South Africa

[73] Assignee: Monres (Proprietary) Limited, Braamfontein, Johannesburg, Transvaal Province, Republic of South Africa

[22] Filed: Sept. 3, 1970

[21] Appl. No.: 69,290

[30] Foreign Application Priority Data

Sept. 9, 1969 South Africa..........................69/6412

[52] U.S. Cl..............................................................52/749
[51] Int. Cl.........................................................E04g 21/22
[58] Field of Search.....................................................52/749

[56] References Cited

UNITED STATES PATENTS 1,606,001  11/1926  Thomson................................52/749
2,818,725  1/1958  Joseph....................................52/749

Primary Examiner—Price C. Faw, Jr.
Attorney—Karl W. Flocks

[57] ABSTRACT

A method of building in which a number of bricks are laid simultaneously in a single course on a previously laid layer of mortar. The bricks may be vibrated to bed them down onto the motor.

A machine having a clamp head adapted to receive a number of bricks in series and to clamp them. The clamp head has a pair of intersecting alignment faces against which the bricks are aligned before being clamped. The clamp head is displaceable from a loading position to an unloading or brick laying position. The clamp head also has a vibrator for bedding the bricks onto a layer of mortar by vibration.

8 Claims, 5 Drawing Figures

BRICK-LAYING MACHINE

This invention relates to a method of building in which building elements, such as for instance bricks, are used. The invention also relates to a machine for laying building elements in the construction of walls and/or prefabricated panels or slabs for the construction of walls.

According to the invention, a method of building is provided which includes aligning a plurality of building elements in series relationship and of laying them simultaneously in alignment in a single course on a previously laid layer of mortar.

The method also includes the subjection of the building elements to vibration in laying them on the layer of mortar, thereby bedding them down on the layer of mortar.

The building elements, before laying, are aligned and this is done by placing them against a pair of intersecting alignment faces. A plurality of building elements are aligned in series relationship against the pair of intersecting alignment faces. One of said alignment faces is then brought into alignment with a side of a wall to be built simultaneously with the laying of the building elements in a single course on the previously laid layer of mortar. During the final laying action the building elements are subjected to vibration to bed them down on the layer of mortar.

The spacing between adjacent building elements is variable to provide a predetermined overall length over the series of elements.

The invention also extends to a machine for laying the building elements. The machine includes a clamp head having a pair of intersecting alignment faces and clamp means adapted to clamp a plurality of building elements in series relationship against the alignment faces; clamp head positioning means for positioning the clamp head to align one of the alignment faces with the side of a wall to be built; and release means to release the grip of the clamp means when the building elements are in proper aligned position.

More particularly, the clamp means includes a plurality of clamp members arranged in series spaced relationship for clamping the building elements independently. Means may also be provided for displacing the clamp means longitudinally relative to each other for providing a predetermined overall length over a series of clamped building elements.

The clamp head is provided with vibrator means. To permit vibration of the clamp head the clamp head is resiliently mounted.

The alignment faces of the clamp head are substantially at right angles to each other. The one face, in a loading position, has its face substantially horizontal while the other projects upwardly. When in the laying position the former face is in alignment with the side of the wall to be built.

The machine incorporates a cradle for displaceably supporting the clamp head. The cradle is displaceably mounted on a carrier and is movable in a direction parallel to the alignment faces of the clamp head. The carrier is mounted on a carriage for displacement relative to the carriage in a horizontal direction and transversely to a line intersecting the alignment faces. The carriage in turn is vertically displaceable along a column. The column is preferably mounted on a trolley which is run on track means parallel to the wall to be built. The various relatively movable parts of the machine are connected by displacing means, preferably power operated through suitable control devices.

In order that the invention may be clearly understood and carried into effect, it will now be described by way of example with reference to the accompanying sheets of drawings.

Figure 1:
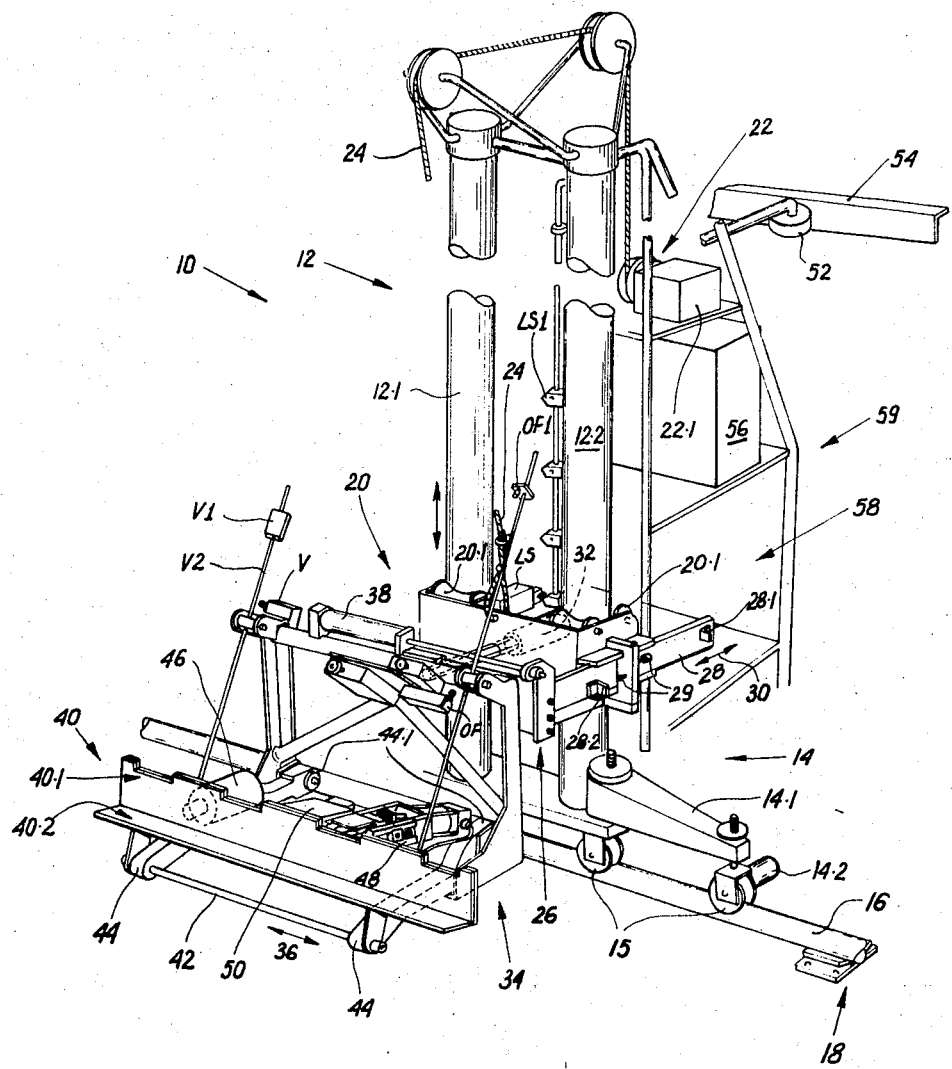
FIG. 1 shows a three dimensional view of one embodiment of a brick laying machine according to the invention.

Referring to the drawings, reference numeral 10 refers generally to a brick laying machine in which certain parts have been left out, for the sake of clarity. Thus, only one of the four clamp members of the clamp head is shown. Furthermore, the lefthand side of the trolley, which is identical to the righthand side, has been left out.

The brick laying machine comprises generally a column 12 in the form of a pair of posts 12.1 and 12.2 spaced laterally, and mounted on a trolley generally indicated by reference numeral 14. The trolley has wheels 15 which are arranged to run on rails 16 of circular section. These rails are supported upon rail support pads 18 which are arranged to be adjustable for levelling the rail 16. The trolley has a pair of opposed stabilizer arms 14.1 only the righthand one of which is shown. A hydraulic motor 14.2 is provided for driving the trolley along the rail 16. The stabilizer arm is arranged to swing inwardly about an axis, to permit the machine to build into inside corners. The column 12 is maintained in a suitable vertical position, by means of a roller 52 running against a steadying rail 54 running behind the machine.

The machine further comprises a carriage generally indicated by reference numeral 20 which is arranged to travel on rollers 20.1, up and down on the column 12 by being hauled upwardly by means of a winch 22 having a rope 24. The winch is driven by a hydraulic motor 22.1. The posts 12.1 and 12.2 are circular in section, and the rollers 20.1 have concave faces. On the carriage 20 a switch LS is mounted which is adapted to engage the cams LS1 when the carriage is raised or lowered by the winch 22 system for stopping the motor 22.1 when the carriage has reached a required position.

On the carriage, there is provided a carrier generally indicated by reference numeral 26 and supported via a pair of laterally spaced side arms 28 in the carriage 20. The carrier 26, is displaceable in a direction along the side arms 28, as indicated by the arrow 30, by means of positioning means in the form of a hydraulic cylinder 32. The arms have brackets 28.1 and 28.2 adapted to engage with adjustable stops 29 to limit the extent of the travel of the carrier 26 in the direction of arrow 30 relative to the carriage 20. The extent of travel conveniently corresponds to the thickness of wall being built.

On the carrier there is mounted a cradle generally indicated by reference numeral 34 which is displaceable in the direction of arrow 36 relative to the carrier 26, by means of a side shift hydraulic cylinder 38.

On the cradle 34, there is pivotally mounted a clamp head generally indicated by reference numeral 40, which is pivotally mounted about the axis of rod 42, at the ends of radius arms 44. The rear ends of the radius arms are resiliently mounted at 44.1 to the cradle 34.

The clamp head 40 comprises a rigid L-section elongated beam-like part having alignment faces 40.1 and 40.2 at right angles to one another. The inside face 40.1 is of a suitable material facing (advantageously of resilient material) fixed replaceably. The face 40.2 is provided by a plurality of spaced protruding transverse ribs 40.3 of which only one is shown in FIG. 2.

The clamp head is pivotally displaceable about its pivotal axis, by means of positioning means in the form of an actuating cylinder 46 which is pivotally connected to the rear of the clamp head. On the clamp head there are mounted four clamp members generally indicated by 48, spaced longitudinally along the clamp head 40. Also mounted on the clamp head, is a vibrator 50.

The various cylinders and motors are operated by a water fluid e.g. hydraulic fluid under pressure. It will be understood, however, that any other suitable watering fluid may be used instead e.g. compressed air. The control of the flow of hydraulic fluid is exercised by means of electrically operable solenoid valves, housed in a valve box 56. Power to operate the machine, is obtained from a motor or engine mounted in the space 58 in the steadying framework 59 of the machine behind the column 12. The method of operation of the machine will be described in greater detail later.

Figure 2:
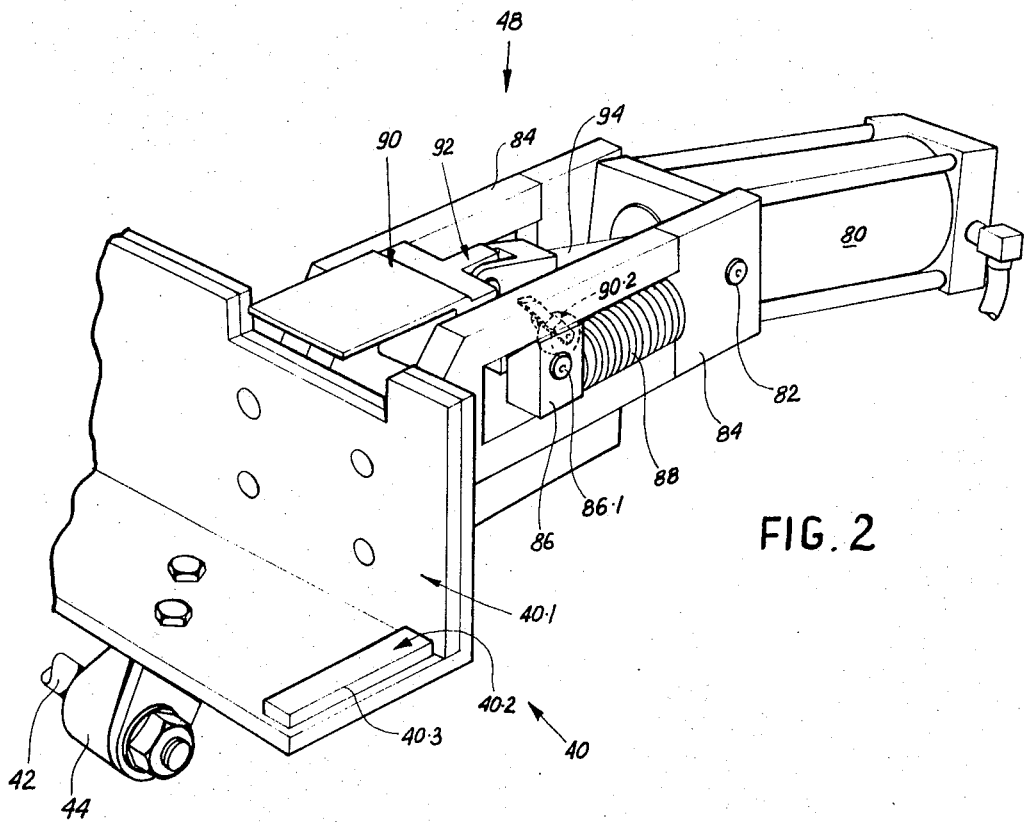
FIG. 2 shows a fragmentary three dimensional view of a clamp member as used in the machine shown in FIG. 1.

Referring now to FIG. 2 of the drawings, there is shown a detail of a clamp member 48, in position on the clamp head 40. The clamp member comprises a clamp cylinder 80 which is pivotally mounted about the axis of a pin 82 at the outer end of posts 84 which define a linear path for a pair of laterally spaced shoes 86 slidable along the path, and urged away from the cylinder 80, by a compression spring 88. A jaw member indicated generally by reference numeral 90, has a rear part pivotally mounted about the axis of pins 86.1 supported in the shoes 86. The rear part of the jaw member is also pivotally connected at 92 to the plunger rod 94 of the clamp cylinder 80.

On extension of the plunger rod 94 the bearing shoes 86 and the jaw member 90 move away from the cylinder 80 due to the assistance given by the springs 86. The jaw member 90 is thereby extended beyond the face 40.1 of the clamp head 40. When the shoes 86 bear against the ends of the guide path, their movement is terminated. Further extension of the plunger rod 94 causes the jaw member 90 to tilt about the axis of pins 86.1, thereby effecting a clamping action at 90.1 on a building element supported on the face 40.1 and resting against the face 40.1. For each building element a separate jaw member 90 and operating assembly are provided. On retraction of the plunger rod 94 the reversed movement of the shoes 86 is restrained by the springs 88 so that the jaw members 90 are firstly swung outwardly to release the building element. Thereafter, the jaw members 90 are retracted. A roller 90.2 rolls along a path and limits the extent to which the jaw member 90 opens.

Figure 3:
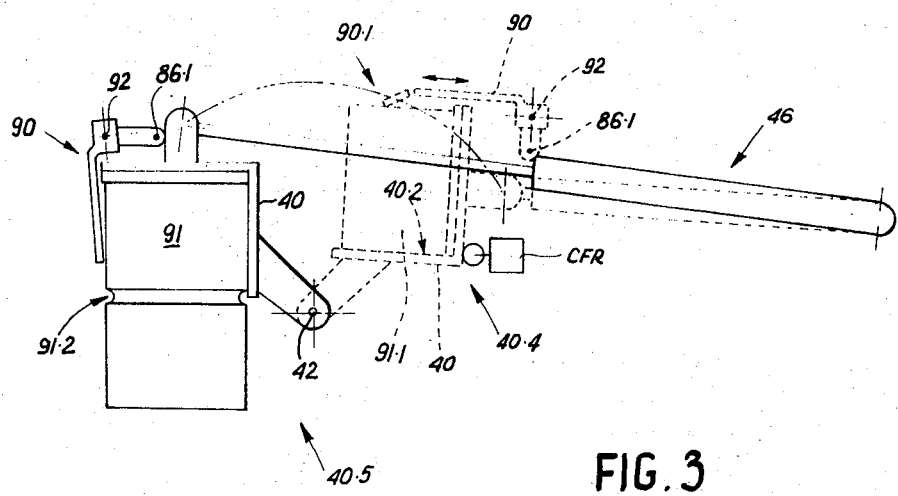
FIG. 3 shows diagrammatically an end view of the clamp head of the machine of FIG. 1, in its two operative positions.

FIG. 3 shows two extreme operative positions of the clamp head 40. FIG. 3 will, however, be more fully described later in relation to the functioning of the machine.

Figure 4:
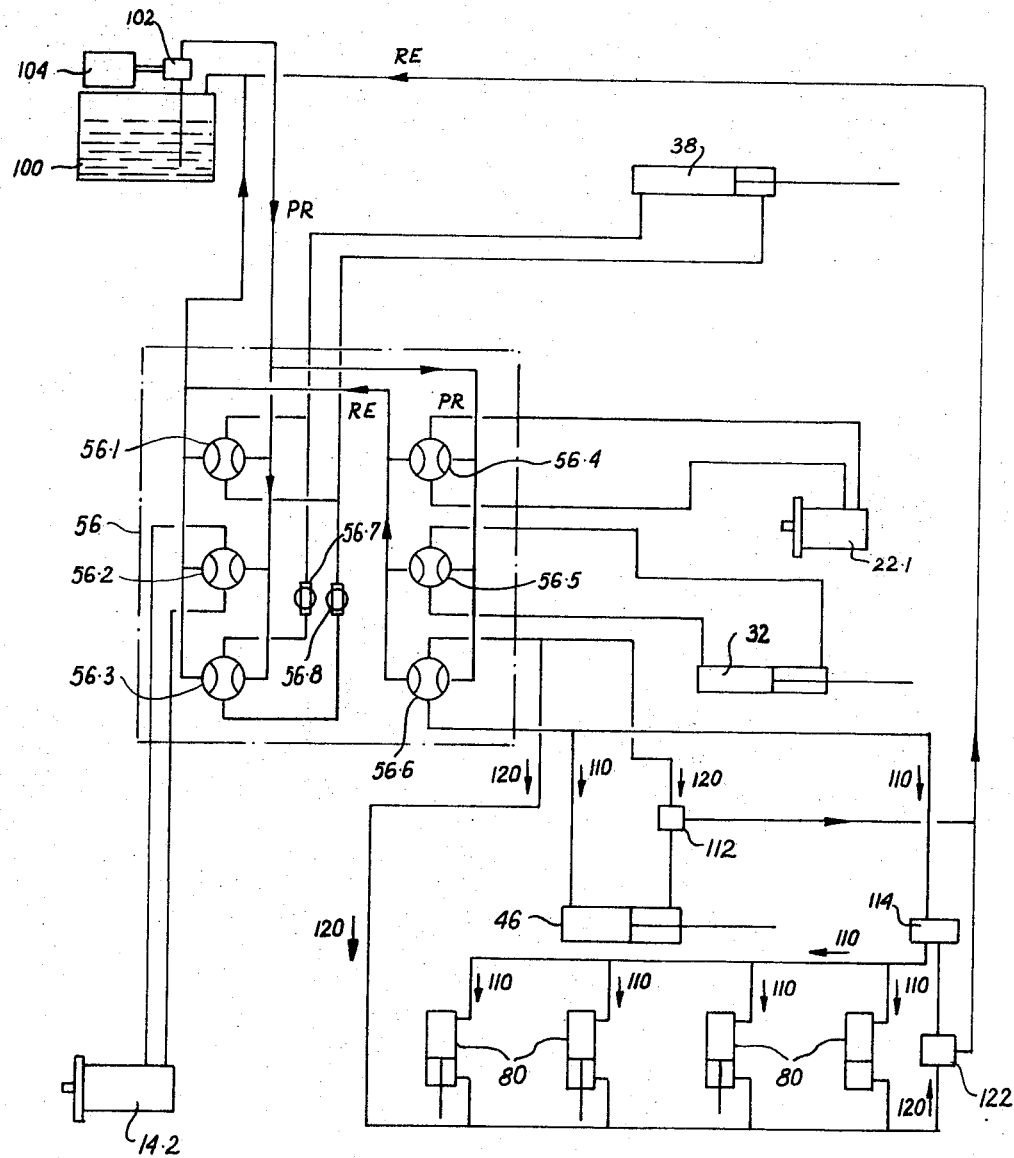
FIG. 4 shows schemmatically the hydraulic flow diagram for the controls of the machine of FIG. 1.

Referring now to FIG. 4 of the drawings, there is shown the hydraulic flow diagram for operating the machine. The flow of hydraulic fluid to the various parts of the apparatus is controlled by solenoid flow control valves of the type having a central closed position. The valves are biassed to this central position and will permit flow in one direction when energized in a particular direction and will permit flow in the opposite direction, when energized in the opposite direction. The various valves are housed in a control box 56 and the valves themselves, are designated by reference numerals 56.1, 56.2, 56.3, 56.4 56.5, and 56.6. In addition, there are provided flow control valves 56.7 and 56.8 for controlling the rate of flow in the fluid flow lines to the side shift cylinder 38. The use of these valves permits the slow or rapid movement of the cradle in side shift.

The hydraulic system comprises a hydraulic fluid reservoir 100, a hydraulic pump 102 and a motor or other suitable prime mover 104. The various cylinders and motors of the apparatus are connected to the valves as shown in the diagram. All return lines are indicated by RE whereas pressure lines are indicated by PR.

In order that the clamp members 48 should clamp building elements, pressure fluid must flow in the direction of arrows 110. The load of bricks on the clamp head 40 ensures that the clamp members 48 will be actuated before the cylinder 46. The clamp members 48 will therefore clamp their building elements 91 before the cylinder 46 starts to tilt the clamp head 40. In addition, a pilot check valve 114 is provided, to ensure that a certain minimum pressure is maintained in the clamp cylinders 80, if an operation is stopped for awhile. This ensures that the jaw members 90 do not loose their grip, by leakage of fluid taking place in the valve 56.6.

In order to get the clamps to release, flow of high pressure hydraulic fluid should take place in the direction of arrow 120. Release means which includes a sequence valve 122 is provided, to ensure that a pressure rise takes place in the feed lines to the clamp cylinders 80 so that they will operate to release the jaw members 90, before tilting of the clamp head 40 takes place back to its initial position. The sequence valve 122 is set so as to provide a pressure rise somewhat greater than that for which the pilot check valve 114 is set. A further sequence valve 112 is provided in the feed line 120 to the tilt cylinder 46. This is set at an even higher valve than the sequence valve 122. Thereby it is ensured that the clamp members 48 will release before the clamp head 40 returns to its 40.4 position. (See FIG. 3.)

Figure 5:
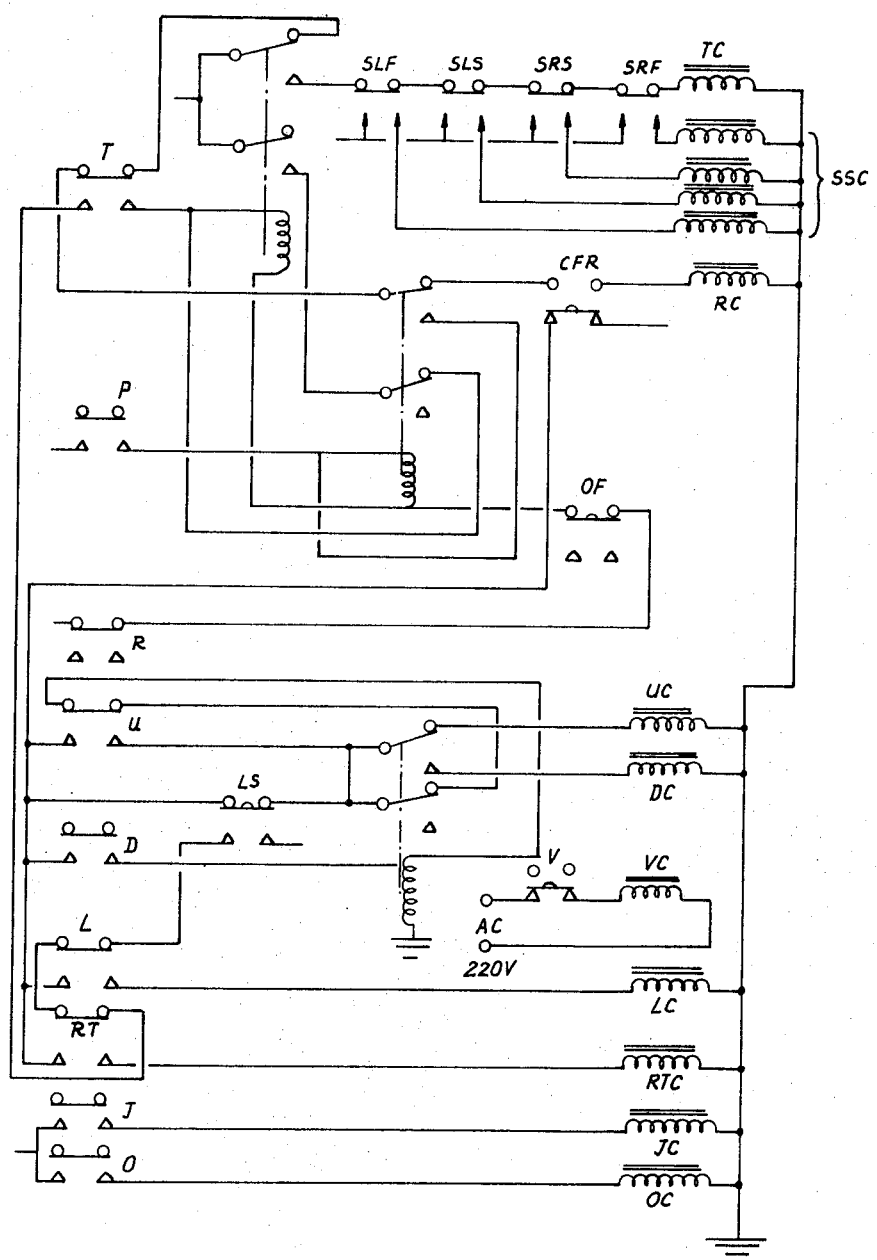
FIG. 5 shows an electrical circuit diagram for the control of the machine of FIG. 1.

Referring now to FIG. 5 of the drawings, the electrical circuit diagram of the apparatus is set out. The various control switches in the form of push button switches, appear on the lefthand side of the drawings and along the top. The various switches and their functions will be discussed later. Certain limit switches are indicated in the drawing itself. The various coils controlled by the push button switches and the limit switches are indicated along the righthand side of the drawing.

The push button switches T, P, and R control the functioning of the cylinder 46 by controlling the flow of hydraulic fluid to it, by means of the valve 56.6. This valve is controlled by the coil of the solenoid TC. Thus depression of the contact button of the switch T will cause the coil R1 to be energized, and will cause the contacts to close thereby energizing TC and causing flow to be admitted to the side of the plunger in the cylinder 46, to cause the clamp head 40 to tilt forward towards a laying position 40.5. (See FIG. 3.) The coil R1 will be held energized over its own contacts and over the contacts unoperated by the relay coil R2.

In operation, building elements in the form of bricks 91.1 will be laid in series relationship, on the clamp head 40. The bricks are aligned against the intersecting alignment faces 40.1 and 40.2. These alignment faces are substantially at right angles. In the load receiving position 40.4 in FIG. 3, the one alignment face 40.2 is substantially horizontal.

When the bricks are in position on the clamp head 40, then the tilt button T is depressed, this causes the coil TC to be energized. (See FIG. 5.) This in turn causes the valve 56.6. (see FIG. 4) to be opened such that pressure oil will flow in the direction of arrows 110. As a result of the initial load on the clamp head 40 there will be a pressure build up in the flow of oil to the various clamp cylinders 80. This will cause the plungers in the cylinders 80 to move before the cylinder 46 becomes operative. The jaw members 90 will be displaced away from the cylinders 80. As soon as the shoes 86 abut at the ends of their guide paths in posts 84, then the plunger rods 94 will extend further, and will cause the jaw members 90 to tilt about their pivotal axes 86.1, thereby exerting pressure at 90.1, thereby gripping the bricks 91. (See FIG. 3.)

As soon as a sufficient pressure is exerted on the bricks 91 at 90.1, there will be a pressure rise in the cylinder 46, and this will be sufficient to cause it to come into operation thereby causing it to extend and to displace the clamp head 40 by tilting about its axis from its loading position 40.4 into its laying for unloading position 40.5. (See FIG. 3.) The bricks are laid on a previously laid layer of mortar 91.2.

As the clamp head 40 reaches the position 40.5, a cam actuated switch V (see FIG. 5 of the drawings) comes into operation. The switch V energizes the vibrator coil VC of a vibrator 50 attached to the clamp head 40 (see FIG. 1 of the drawings). The switch V is operated by a block V1 attached to a rod V2 which is itself attached to the clamp head 40. The block V1 is so arranged, that it operates the switch V when the clamp head 40 is approaching and in the position 40.5. This causes the clamp head to impart a vibration to the bricks 91 thereby ensuring that they are bedded down on a layer of mortar.

When the clamp head has reached its full travel release means which includes an operation finished switch OF is actuated by the stop OF1. This action changes over the solenoid valve 56.6. so that the jaw members 90 release the bricks and the tilt cylinder 46 retracts the clamp head 40. When the clamp head is fully retracted it operates the clamp fully retracted microswitch CFR, thereby de-energizing the coil TC and hence the valve 56.6 returns to its central neutral position.

If it is desired to cause the clamp head 40 to pause for awhile in any one of its operative positions, or in between, then that can be done by depressing the button P and releasing it. This causes the relay coil R1 to be de-energized and hence the coil TC is de-energized and valve 56.6. returns to its neutral position. This suspends the further tilting of the clamp head 40. From this position either the tilt button T or the retract button R may be depressed. If the tilt button T is depressed, the clamp head 40 will continue to move as before. If the R button is used the clamp head will return to its 40.4 position.

The lift push buttons U and D, operate the up and down movement of the carriage 20 by energizing the solenoids UC and DC thereby causing the valve 56.4 (see FIG. 4) to be suitably positioned for up or down movement. A lift stop limit switch LS (see FIG. 5 and FIG. 1) is provided. This limit switch is operable by the cams LS1 arranged in series vertically, at a spacing which corresponds to the spacing between courses of the building elements. When the appropriate button is depressed or released the solenoid valve will remain in the appropriate position only until the next cam LS1 operates the switch LS whereupon the valve becomes deenergized. If either of these buttons is held depressed, the carriage will continue to climb or descend until the button is released until the next cam LS1 tips the microswitch LS.

The push buttons L and RT control the energization of the coils LC and RTC of the solenoid valves 56.2 for controlling the movement of the apparatus along the rail 16 by means of motor 14.2. The apparatus will move along the rail in the required direction for as long as the appropriate button is depressed.

The push button switches J and O, control the operation of the coils JC and OC of the solenoid valve 56.5 controlling the flow of hydraulic fluid to cylinder 32 for causing the carrier to move forwardly and backwardly in the direction of arrow 30, relative to the carrier 20. The carrier will stop when the brackets 28.1 and 28.2 encounter the preset stops 29.

The push button switches SLF, SLS, SRS, and SRF, are arranged to energize the various coils SSC for the valves feeding the side shift cylinder 38. The button SLF, is arranged to give a fast side shift leftwards, the SLS push button is arranged to give a slow side shift leftwards. The SRS push button is arranged to give a slow side shift rightwards, and the SRF button is arranged to give a fast side shift rightwards.

A switch OF is operable by a stop OF1 when the clamp head 40 has reached its fully forward position 40.5. (See FIG. 1 and FIG. 5.)

Thus one operator will lay a layer of mortar, another operator or operators will lay building elements on the clamp head 40, and a further operator will operate the machine. He will do this by positioning the machine. Then he will position the head at a suitable elevation and at a suitable distance from the wall to be built. The building elements in successive courses can be suitably staggered by making use of the side shift control. These gaps can be filled in by another operator.

It is believed that the mechanisation of building operations will at least partly meet the shortage of skilled labor.

What I claim is:

1. A machine for laying building elements, which includes a clamp head having a pair of intersecting alignment faces and clamp means adapted to clamp a plurality of building elements in series relationship against the alignment faces; clamp head positioning means for positioning the clamp head to align one of the alignment faces with the side of a wall to be built; and release means to release the grip of the clamp means when the building elements are in proper aligned position.

2. A machine as claimed in claim 1, in which the clamp head is resiliently mounted and in which it is provided with vibrator means.

3. A machine as claimed in claim 1, in which the alignment faces of the clamp head are substantially at right angles to each other; and in which the clamp head has a loading position in which one alignment face is substantially horizontal and the other alignment face projects upwardly above it along an edge remote from the wall to be built, and a laying position in which the face which is substantially horizontal in the loading position, is in alignment with the side of the wall to be built.

4. A machine as claimed in claim 3, which includes a cradle, the clamp head being mounted on the cradle; and in which the clamp head positioning means includes actuating means for displacing the clamp head.

5. A machine as claimed in claim 4, which includes a carrier, the cradle being mounted on the carrier and being displaceable relative thereto in a direction parallel to the alignment faces of the clamp head, and in which there is provided side shift displacing means for displacing the cradle relative to the carrier in the said direction.

6. A machine as claimed in claim 5, which includes a carriage, the carrier being mounted on the carriage and being displaceable relative thereto in a horizontal direction transversely to the line of intersection of the alignment faces, and in which the clamp head positioning means includes carrier displacing means for displacing the carrier relative to the carriage in the said direction.

7. A machine as claimed in claim 6, in which there is provided a column, the carriage being displaceable along the column in steps corresponding to the height between courses of building elements, and in which carriage displacing means are provided for displacing the carriage along the column.

8. A machine as claimed in claim 7, in which there is provided a trolley adapted to run along a guide track, and in which the column is mounted on the trolley.

* * * * *